(12) United States Patent
Gerhardt

(10) Patent No.: US 10,106,033 B2
(45) Date of Patent: Oct. 23, 2018

(54) FUEL COLLECTION DEVICE FOR A MOTOR VEHICLE

(71) Applicant: Continental Automotive GmbH, Hannover (DE)

(72) Inventor: Marc Gerhardt, Dortmund (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/105,257

(22) PCT Filed: Dec. 12, 2014

(86) PCT No.: PCT/EP2014/077490
§ 371 (c)(1),
(2) Date: Jun. 16, 2016

(87) PCT Pub. No.: WO2015/091236
PCT Pub. Date: Jun. 25, 2015

(65) Prior Publication Data
US 2016/0311318 A1    Oct. 27, 2016

(30) Foreign Application Priority Data
Dec. 17, 2013   (DE) .................. 10 2013 226 291

(51) Int. Cl.
*B60P 3/00* (2006.01)
*B60K 15/077* (2006.01)
*B60K 15/03* (2006.01)

(52) U.S. Cl.
CPC ............ *B60K 15/077* (2013.01); *B60K 15/03* (2013.01); *B60K 2015/03111* (2013.01); *B60K 2015/03236* (2013.01); *B60K 2015/03256* (2013.01); *B60K 2015/0777* (2013.01)

(58) Field of Classification Search
CPC .................. B60K 15/077; B60K 15/03; B60K 2015/03111; B60K 2015/0777; B60K 2015/03256; B60K 2015/03236
USPC .... 220/562, 582, 4.13, 4.14, 4.15, 601, 625, 220/661, 676, 692, 560.04–560.15, 4.17
See application file for complete search history.

(56) References Cited

U.S. PATENT DOCUMENTS

| 6,464,872 B1 | 10/2002 | Honda |
| 7,198,035 B2 | 4/2007 | Kadler et al. |
| 7,992,546 B2* | 8/2011 | Eck ...................... B60K 15/077 123/509 |
| 8,511,283 B2 | 8/2013 | Rinke et al. |

(Continued)

FOREIGN PATENT DOCUMENTS

| CN | 101489818 | 7/2009 |
| CN | 101490401 | 7/2009 |

(Continued)

OTHER PUBLICATIONS

Office Action dated Dec. 13, 2017 which issued in the corresponding Chinese Patent Application No. 201480062671.9.

*Primary Examiner* — Kareen Thomas
(74) *Attorney, Agent, or Firm* — Cozen O'Connor

(57) ABSTRACT

A fuel collection device for a motor vehicle, includes: a splash pot; and a prefilter arranged in a bottom region of the splash pot. The prefilter has first annular part structures and second annular part structures, the first and second annular part structures being arranged so as to lie opposite one another.

6 Claims, 2 Drawing Sheets

(56) References Cited

U.S. PATENT DOCUMENTS

| | | |
|---|---|---|
| 8,784,656 B2 | 7/2014 | Wehner |
| 9,102,231 B2 * | 8/2015 | Nakajima ............ B60K 15/077 |
| 2001/0020622 A1 * | 9/2001 | Schmidt ............... B60K 15/067 |
| | | 220/562 |
| 2003/0057213 A1 * | 3/2003 | Souma ................. B60K 15/035 |
| | | 220/562 |
| 2004/0154670 A1 * | 8/2004 | Gerhardt .......... B60K 15/03504 |
| | | 137/588 |
| 2006/0011172 A1 | 1/2006 | Kadler et al. |
| 2009/0188574 A1 | 7/2009 | Eck et al. |
| 2009/0255515 A1 | 10/2009 | Eck et al. |
| 2010/0181245 A1 | 7/2010 | Wehner |
| 2011/0017748 A1 * | 1/2011 | Palma .................. B60K 15/077 |
| | | 220/562 |
| 2012/0181293 A1 | 7/2012 | Rinke et al. |

FOREIGN PATENT DOCUMENTS

| | | |
|---|---|---|
| CN | 101687123 | 3/2010 |
| DE | 19834653 C1 | 12/1999 |
| DE | 19857863 A1 | 6/2000 |
| DE | 60010142 T2 | 11/2004 |
| DE | 102006032101 A1 | 1/2008 |
| DE | 102007032057 A1 | 1/2009 |
| EP | 1028018 | 8/2000 |
| EP | 1619065 A1 | 1/2006 |
| GB | 2340096 | 2/2000 |

\* cited by examiner

FUEL COLLECTION DEVICE FOR A MOTOR VEHICLE

CROSS-REFERENCE TO RELATED APPLICATIONS

This is a U.S. national stage of application No. PCT/EP2014/077490, filed on 12 Dec. 2014, which claims priority to the German Application No. 10 2013 226 291.4 filed 17 Dec. 2013, the content of both incorporated herein by reference.

BACKGROUND OF THE INVENTION

1. Field of the Invention

The invention relates to a fuel collection device for a motor vehicle having a splash pot, having a prefilter arranged in the bottom region of the splash pot, and having structures of the prefilter manufactured from plastic.

2. Related Art

Fuel collection devices of this type are fastened to the bottom of a fuel tank via a holding element in current motor vehicles and are known from practice. In the case of such collection devices, the fuel is cleaned roughly by way of the prefilter before it passes into the splash pot. The aim is to protect the functional elements that are connected downstream, such as a bottom valve or a suction jet pump, against failure. In the splash pot, the fuel is collected and is delivered by a fuel delivery device to an internal combustion engine of the motor vehicle. Owing to the function, it is necessary that the prefilter is arranged as close as possible to the bottom of the fuel tank. As a result of the use of a holding element under the splash pot, the splash pot is raised up and the delivery of the fuel in the splash pot is changed disadvantageously.

The prefilter can be produced directly on the splash pot from structures manufactured from plastic. Compensation by way of lengthening of the prefilter structures in the splash pot into a depression of the holding element impairs the filter performance in relation to the size of the dirt particles.

SUMMARY OF THE INVENTION

An object of the present invention is to solve the problem of developing a fuel collection device of the type mentioned at the outset in such a way that it makes a particularly high filter performance of the prefilter possible and can be manufactured as simply as possible.

According to an aspect of the invention, this problem is solved by the prefilter having part structures arranged in each case on components that lie opposite one another, and the part structures of the components lying opposite one another.

As a result of this design, the structures required for filtering are divided over two different components. Therefore, the part structures of the individual components together form the structures of the prefilter. By virtue of the invention, the part structures can in each case be produced with a low depth, since they form the provided depth when taken together. As a result, the part structures have particularly high mechanical stability. This makes high filter performance of the prefilter possible. Also by virtue of the invention, the fuel collection device can be manufactured particularly simply, since particularly fine structures of the prefilter are not needed.

According to another advantageous development of the invention, the number of components to be assembled can be kept particularly low if some part structures are arranged on the splash pot and other part structures are arranged on a holding element provided on a bottom of a fuel tank for fastening the splash pot. As a result of this design, no component to be assembled independently is required for the prefilter, since all components of the prefilter are produced by the holding element and the splash pot. A further advantage of the design is that the holding element and the splash pot are oriented precisely with respect to one another in any case, so that the provided arrangement of the part structures with respect to one another does not require any additional outlay. The part structures are preferably manufactured in one piece with the plastic of the splash pot and the holding element.

According to another advantageous development of the invention, the manufacture of the prefilter is particularly simple if the part structures are configured as elevations or depressions produced using the injection molding process.

For example, the part structures might engage into one another and produce particularly small channels as a result. However, this requires narrow tolerances of the part structures. According to another advantageous development of the invention, narrow tolerances of the part structures can be avoided simply if the part structures lie on one another. In the simplest case, the part structures are supported on one another by way of their free ends.

The part structures might have, for example, pins, webs or the like. According to another advantageous development of the invention, effective prefiltering can be achieved simply if the part structures are of arcuate design.

According to another advantageous development of the invention, a labyrinth of channels in the prefilter can be produced simply if the arcuate shape of two part structures which lie opposite one another is arranged so as to be opposed to one another.

According to another advantageous development of the invention, the fuel collection device is particularly compact if the part structures are of annular design in the bottom region of the splash pot, and if a bottom valve is arranged in the radially inner region of the part structures.

According to another advantageous development of the invention, throttle points during the inflow of the fuel to the prefilter can be largely avoided if the holding element is of planar design in the region of the prefilter, and if the splash pot has a recess for the inflow of the fuel to the prefilter. As a result of this design, the holding element can be of as thin-walled a design as possible, as required for the mechanical strength. The recess in the splash pot makes it possible to conduct the fuel that flows in from the fuel tank to the prefilter.

According to another advantageous development of the invention, the part structures of the holding element make high filter performance possible if part structures configured as depressions in the holding element taper toward the radially inner region of the prefilter and are longer than the part structures of the splash pot. In addition, the holding element can be of particularly thin-walled design as a result.

BRIEF DESCRIPTION OF THE DRAWINGS

The invention permits numerous embodiments. For further clarification of its fundamental principle, one of them is shown in the drawing and will be described in the following text. In the drawings.

DETAILED DESCRIPTION OF THE PRESENTLY PREFERRED EMBODIMENTS

Figure 1:
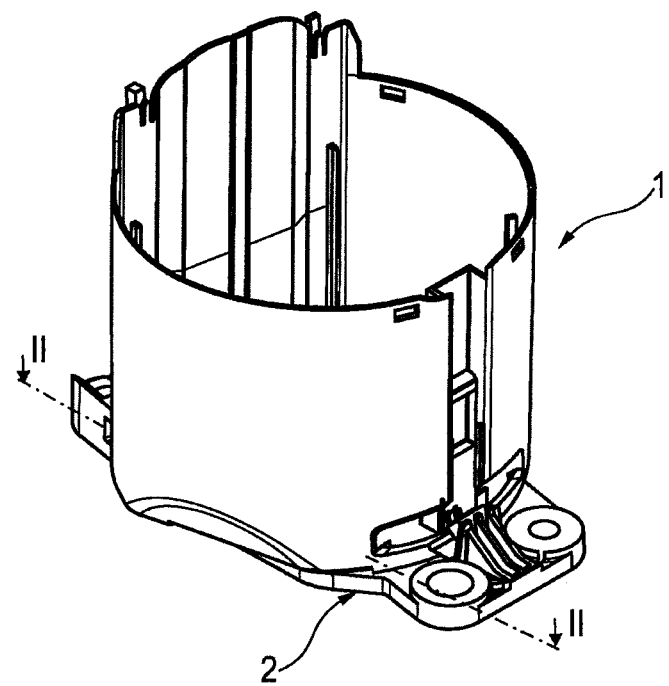
FIG. 1 shows a perspective illustration of a fuel collection device.

FIG. 1 shows a fuel collection device for a motor vehicle having a splash pot 1 for collecting fuel and having a holding element 2. The holding element 2 serves to be fastened to a bottom (not shown) of a fuel tank. Fuel is sucked from the splash pot 1 and is delivered to an internal combustion engine (likewise not shown) of the motor vehicle.

Figure 2:
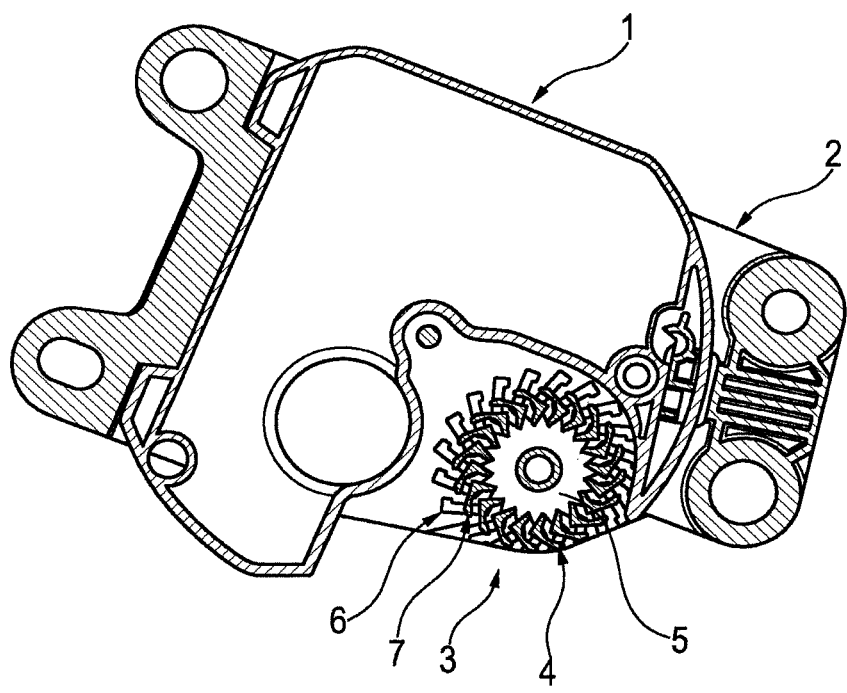
FIG. 2 shows a sectional illustration through the fuel collection device from FIG. 1 along the line II-II.

FIG. 2 shows a sectional illustration through the fuel collection device from FIG. 1 along the line II-II. It can be seen here that a prefilter 3 is arranged between the holding element 2 and the splash pot 1. The prefilter 3 has a multiplicity of structures 4 manufactured from plastic and through which fuel flows from the radial outside into a radially inner region 5 and is filtered in the process. The structures 4 of the prefilter 3 are configured as annular part structures 6, 7 which lie above one another. The annular part structures 6, 7 in each case have an arcuate shape, the two arcuate shapes which lie above one another being oriented such that they are opposed to one another.

Figure 3:
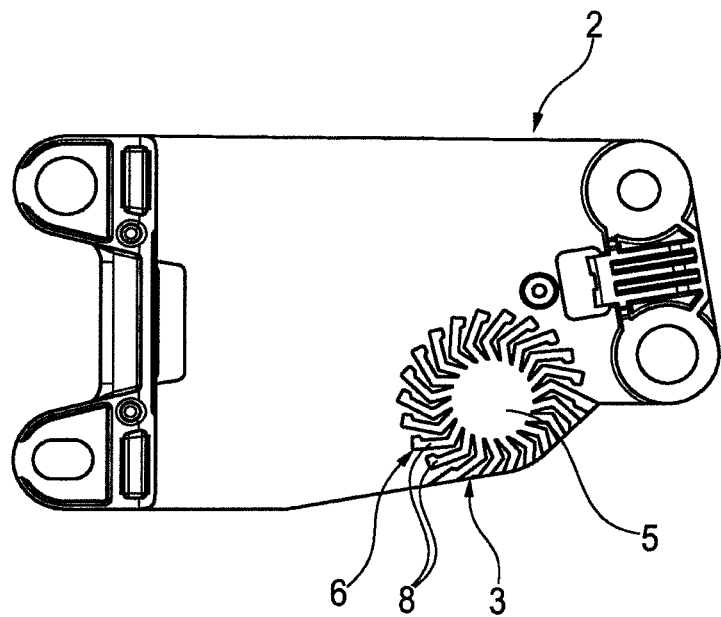
FIG. 3 shows a plan view of a holding element of the fuel collection device from FIG. 1.

FIG. 3 shows a plan view of the holding element 2 of the fuel collection device from FIG. 1. It can be seen in the figure that the holding element 2 is of planar design in the region of the prefilter 3. The holding element 2 has only one of the annular part structures 6 from FIG. 2. The part structures arranged in the holding element 2 are configured as channel-like depressions 8 in the holding element 2. The channel-like depressions 8 taper toward the radially inner region 5 of the prefilter 3.

Figure 4:
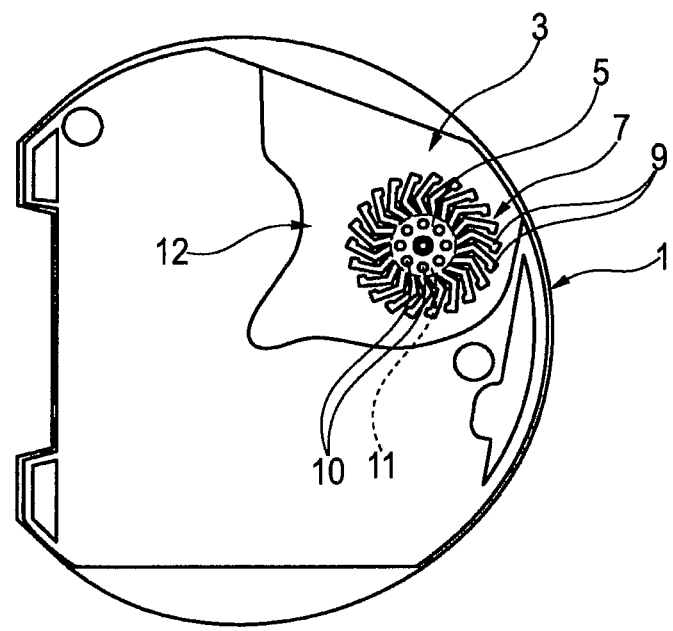
FIG. 4 shows a view from below of a splash pot of the fuel collection device from FIG. 1.

FIG. 4 shows the splash pot 1 from FIG. 1 in a view from below and therefore a view as seen from the holding element 2. It can be seen in this figure that the splash pot 1 likewise has only one of the annular part structures 7 of the prefilter 3 from FIG. 2. The annular part structures 7 on the splash pot 1 are formed from elevations 9 which are manufactured from plastic using the injection molding process. Openings 10 of a bottom valve 11 are arranged in the radially inner region 5 of the part structures 7. The fuel filtered by the prefilter 3 from FIG. 2 passes via these openings 10 of the bottom valve 11 into the splash pot 1. Further, the splash pot 1 has a recess 12 that encloses the part structures 7 for conducting the fuel to the prefilter 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel collection device for a motor vehicle, comprising:
    a splash pot (1);
    a prefilter (3) arranged in a bottom region of the splash pot (1), the prefilter having first annular part structures (6) and second annular part structures (7), the first and second annular part structures (6, 7) being arranged so as to lie opposite one another; and
    a holding element (2) arranged on a bottom of a fuel tank so as to fasten the splash pot (1),
    wherein the second annular part structures (7) are arranged on the splash pot (1) and the first annular part structures (6) are arranged on the holding element (2), and
    wherein the first annular part structures (6) are configured as channel-like depressions in the holding element (2) and the second annular part structures (7) are configured as elevations (9) on the splash pot (1), the elevations (9) and depressions (8) being formed of injection-molded plastic.

2. The fuel collection device as claimed in claim 1, wherein the first and second annular part structures (6, 7) are arcuate in configuration.

3. The fuel collection device as claimed in claim 2, wherein the arcuate configuration of the first annular part structures (6) is arranged oppositely to the arcuate configuration of the second annular part structures (7).

4. The fuel collection device as claimed in claim 3, further comprising a bottom valve (11) arranged in the radially inner region (5) of the second annular part structures (7).

5. The fuel collection device as claimed in claim 4, wherein the holding element (2) is of planar configuration in a region of the prefilter (3), and the splash pot (1) has a recess (12) configured to permit fuel inflow to the prefilter (3).

6. The fuel collection device as claimed in claim 5, wherein the first annular part structures (6) taper toward the radially inner region (5) of the prefilter (3) and are longer than the second annular part structures (7).

\* \* \* \* \*